United States Patent [19]
Ayaki et al.

[11] Patent Number: 5,537,139
[45] Date of Patent: Jul. 16, 1996

[54] IMAGE PRINTING APPARATUS

[75] Inventors: Yasushi Ayaki, Neyagawa; Takeshi Shimamoto, Hirakata, both of Japan

[73] Assignee: Matsushita Electric Industrial Co., Ltd., Kadoma, Japan

[21] Appl. No.: 146,584

[22] Filed: Nov. 1, 1993

[30] Foreign Application Priority Data

Nov. 4, 1992 [JP] Japan .................. 4-294839

[51] Int. Cl.⁶ .................. B41J 2/32; B41J 2/325
[52] U.S. Cl. .................. 347/171
[58] Field of Search .................. 347/233, 171, 347/218, 224, 203

[56] References Cited

U.S. PATENT DOCUMENTS

| | | | |
|---|---|---|---|
| 4,205,387 | 5/1980 | Oshinsky et al. | 364/900 |
| 4,616,564 | 10/1986 | Faddis et al. | |
| 4,639,743 | 1/1987 | Sakura et al. | 346/76 PH |
| 4,660,052 | 4/1987 | Kaiya et al. | 347/200 |
| 4,792,860 | 12/1988 | Kuehrie. | |
| 4,913,526 | 4/1990 | Hediger. | |
| 5,003,323 | 3/1991 | Onuki et al. | 346/76 PH |

FOREIGN PATENT DOCUMENTS

| | | |
|---|---|---|
| 0444331 | 9/1991 | European Pat. Off. |
| 2364765 | 4/1978 | France. |
| 5856859 | 4/1983 | Japan. |
| 1188397 | 7/1989 | Japan. |
| 1208157 | 8/1989 | Japan. |
| 3034893 | 2/1991 | Japan. |
| 3149682 | 6/1991 | Japan. |
| 3234670 | 10/1991 | Japan. |

OTHER PUBLICATIONS

IBM Technical Disclosure Bulletin, vol. 23, No. 1, (1980), pp. 147–148.

Primary Examiner—Huan H. Tran
Assistant Examiner—Thinh Nguyen
Attorney, Agent, or Firm—Renner, Otto, Boisselle & Sklar

[57] ABSTRACT

An image printing apparatus according to the present invention includes a conveying section for conveying a printing medium including a first portion and a second portion; a section for making a first printing material adhere to the first portion of the printing medium; and a section for making a second printing material adhere to the second portion of the printing medium, the first and second printing materials being different from each other.

12 Claims, 5 Drawing Sheets

IMAGE PRINTING APPARATUS

BACKGROUND OF THE INVENTION

1. Field of the Invention

The present invention relates to an image printing apparatus for printing image data in at least two different types of printing forms, such as printing densities and printing colors.

2. Description of the Related Art

In making a document, one may desire to form printed images having different properties on a paper sheet. An image printing apparatus for printing characters, pictures and machine-readable codes corresponding to the characters and pictures has been proposed in Japanese Laid-Open Patent Publication No. 3-149682. Hereinafter, a machine-readable code is simply referred to as a "code". Such a conventional image printing apparatus combines input image data corresponding to characters and pictures with input image data corresponding to codes so as to output the combined image data to a printing control circuit. Then, the characters, picture, and codes are printed in the same form by the use of a single printing mechanism.

Actually, if a printing density of the image printing apparatus is 12 dots/mm, it is sufficient for printing characters and pictures for practical use. However, a higher printing density such as 16 dots/mm, 24 dots/mm or more is desired in order to print codes. This is because a printing area for codes can be reduced as the printing density increases.

Conventionally, characters, pictures and codes are printed in the same printing density. Accordingly, a printing density suitable for printing characters and pictures would not be sufficient for printing codes. On the contrary, a printing density suitable for printing codes would be too high for printing characters and pictures. This causes a problem of increase in the capacity of memories for storing printing data, increase in the scale of the circuit, decrease in the processing speed, and decrease in the printing speed.

Furthermore, in printing characters, the size of each printed dot is designed to be larger than the sub-scanning pitch so that a printed dot of a character corresponding to a line may overlap with another printed dot of a character corresponding to an adjacent line. This is because, in printing characters, it may be necessary to print the characters with no space between adjacent lines and/or to print thin lines. In printing codes, however, any space between printed dots of a code is likely to be eliminated in the case where a printed dot of a code corresponding to a line may overlap with another printed dot of a code corresponding to an adjacent line, thus making it difficult to detect the information represented by printed dots of codes.

SUMMARY OF THE INVENTION

An image printing apparatus according to the present invention includes a conveying section for conveying a printing medium including a first portion and a second portion; a section for making a first printing material adhere to the first portion of the printing medium; and a section for making a second printing material adhere to the second portion of the printing medium, the first and second printing materials being different from each other.

In one embodiment of the invention, the second printing material transmits a visible region of a light spectrum and absorbs at least a portion of an invisible region of the light spectrum.

In another embodiment of the invention, the surface of the second portion of the printing medium to which the second printing material is made to adhere has substantially the same luminous reflectance as the surface of the printing medium.

Alternatively, an image printing apparatus according to the present invention includes: a conveying section for conveying the printing material in a first direction; a section for conveying a material sheet including a first printing material and a second printing material in the first direction, the first and second printing materials being separated from each other along the first direction; and a transferring section including a plurality of printing elements arranged in a second direction which is substantially perpendicular to the first direction, the plurality of printing elements transferring the first and second printing materials of the material sheet onto the printing medium.

In one embodiment of the invention, the second printing material transmits a visible region of a light spectrum and absorbs at least a portion of an invisible region of the light spectrum.

In another embodiment of the invention, the surface of a portion of the printing medium onto which the second printing material is transferred has substantially the same luminous reflectance as the surface of the printing medium.

In still another embodiment of the invention, the material sheet is a thermal-transferable ink sheet, and the printing elements are heat emitting elements.

Alternatively, an image printing apparatus according to the present invention includes: a conveying section for conveying a printing medium in a first direction; a printing section for printing an image including a plurality of dots on the printing medium, the printing section including a plurality of first printing elements and a plurality of second printing elements, each of the plurality of first printing elements printing one of the plurality of dots included in the image printed on the printing medium, and each of the plurality of second printing elements printing one of the plurality of dots included in the image printed on the printing medium, wherein the plurality of first printing elements are arranged in a second direction which is substantially perpendicular to the first direction, being spaced by a first pitch from one another, and the plurality of second printing elements are arranged in the second direction, being spaced by a second pitch from one another, and wherein the first pitch and the second pitch are different from each other.

In one embodiment of the invention, the plurality of second printing elements print an image on at least one of end portions of the printing medium.

In another embodiment of the invention, the plurality of first printing elements and the plurality of second printing elements are disposed substantially on a single straight line.

In still another embodiment of the invention, a first region on the printing medium overlaps with a second region on the printing medium, where the first region is defined as a region printable by the plurality of first printing elements and the second region is defined as a region printable by the plurality of second printing elements.

Thus, the invention described herein makes possible an advantage of providing an image printing apparatus capable of printing image data having different properties in different printing forms, such as printing densities and printing colors.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, the term "character" refers not only to a character, but also to a picture, as opposed to "code" in order to keep the descriptions concise.

Figure 1:
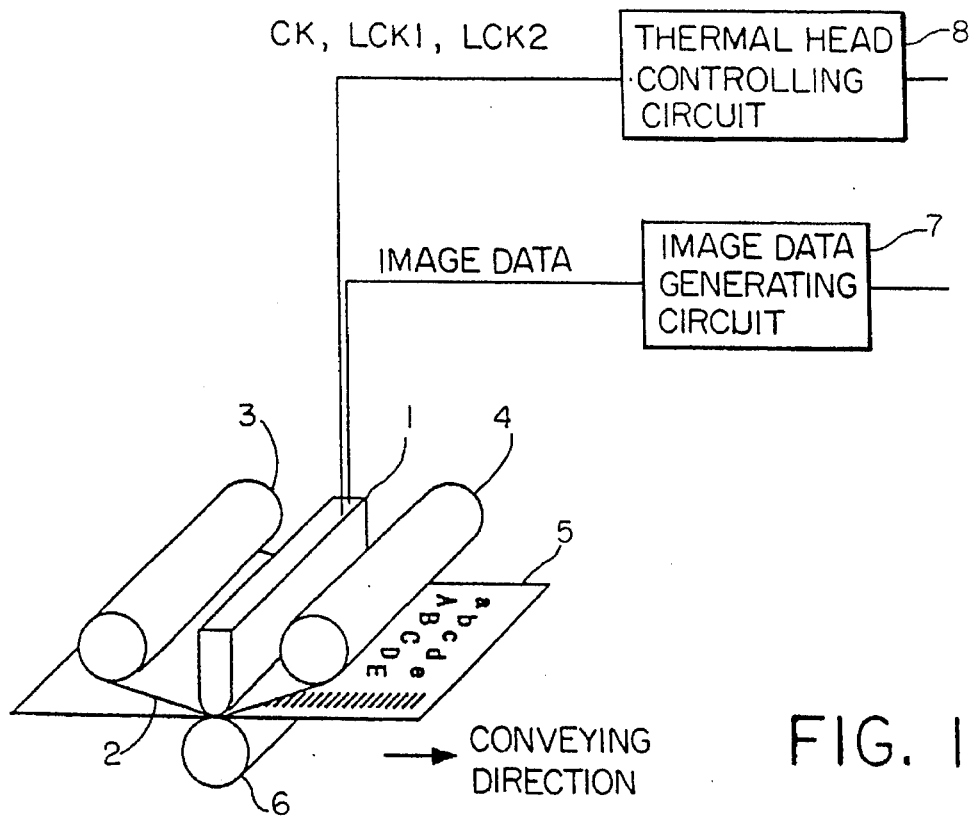
FIG. 1 is a block diagram showing an image printing apparatus according to a first example of the present invention.

FIG. 1 shows a configuration an image printing apparatus according to the first example of the present invention. The imaging apparatus includes a platen roller 6 for conveying a paper sheet 5 in a first direction, a sheet setting portion 3 and a sheet winding portion 4 for conveying a thermal-transferable ink sheet 2 in the first direction, and a thermal head 1 for forming an image on the paper sheet 5 by transferring at least a portion of the thermal-transferable ink sheet 2 onto the paper sheet 5.

The image printing apparatus further includes an image data generating circuit 7 for generating image data and supplying the image data to the thermal head 1, and a thermal head controlling circuit 8 for supplying a clock pulse CK and latch clock pulses LCK1 and LCK2 to the thermal head 1.

Figure 2:
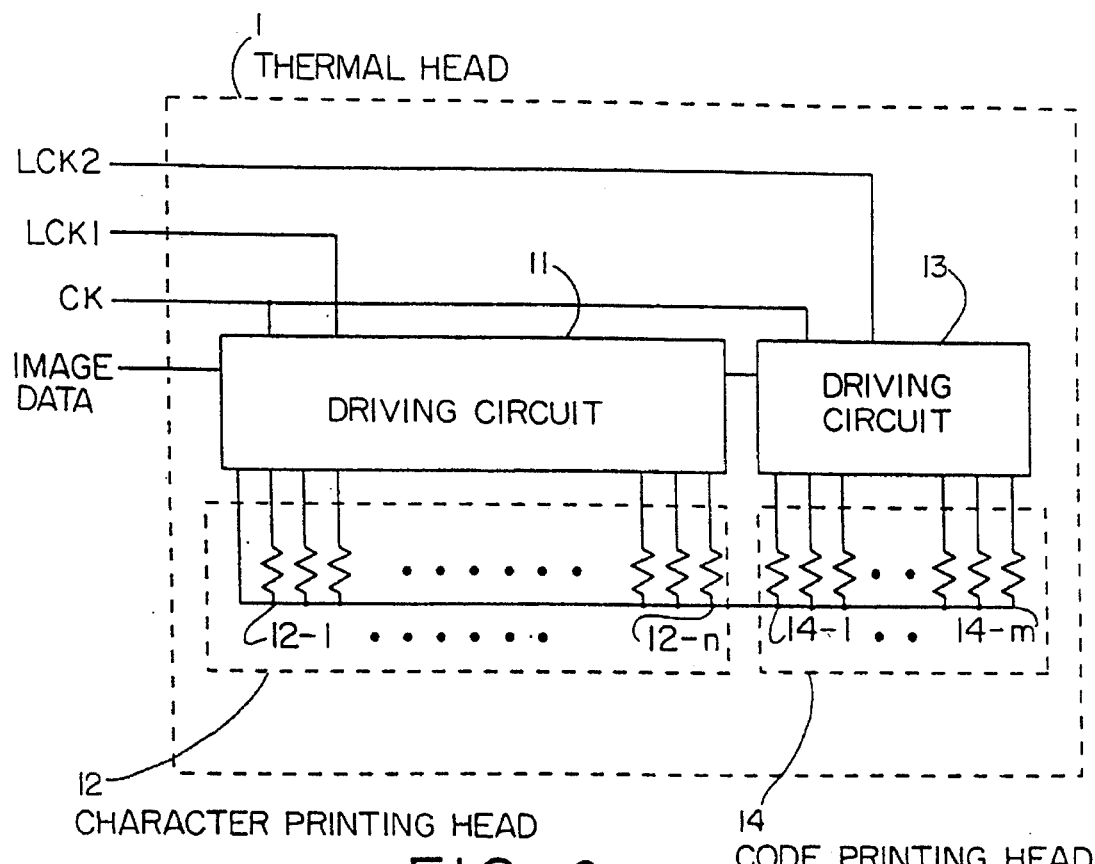
FIG. 2 is a block diagram showing a thermal head of a first example of the present invention.

FIG. 2 shows a configuration of the thermal head 1. As is shown in FIG. 2, the thermal head 1 includes a character printing head 12 including a plurality of heat emitting elements $12_{-1}$ to $12_{-n}$ which are arranged in a second direction which is substantially perpendicular to the first direction and a code printing head 14 including a plurality of heat emitting elements $14_{-1}$ to $14_{-m}$ which are arranged in the second direction. The plurality of heat emitting elements $14_{-1}$ to $14_{-m}$ are arranged twice as densely as the heat emitting elements $12_{-1}$ to $12_{-n}$ are arranged. More specifically, the plurality of heat emitting elements $12_{-1}$ to $12_{-n}$ are spaced by a first pitch from one another in the second direction, the plurality of heat emitting elements $14_{-1}$ to $14_{-m}$ are spaced by a second pitch from one another in the second direction, and the first pitch is twice as large as the second pitch. In addition, the plurality of heat emitting elements $12_{-1}$ to $12_{-n}$ and the plurality of heat emitting elements $14_{-1}$ to $14_{-m}$ are disposed substantially on a straight line along the second direction.

The thermal head 1 further includes a driving circuit 11 for driving the character printing head 12 and a driving circuit 13 for driving a code printing head 14.

These components 11 to 14 may be provided on a single substrate. It is preferable that the code printing head 14 is provided at one end of the thermal head 1, corresponding to the right end of the paper sheet 5. This is because there is usually a blank space on the right end of a document, where the codes are to be printed.

Figure 3:
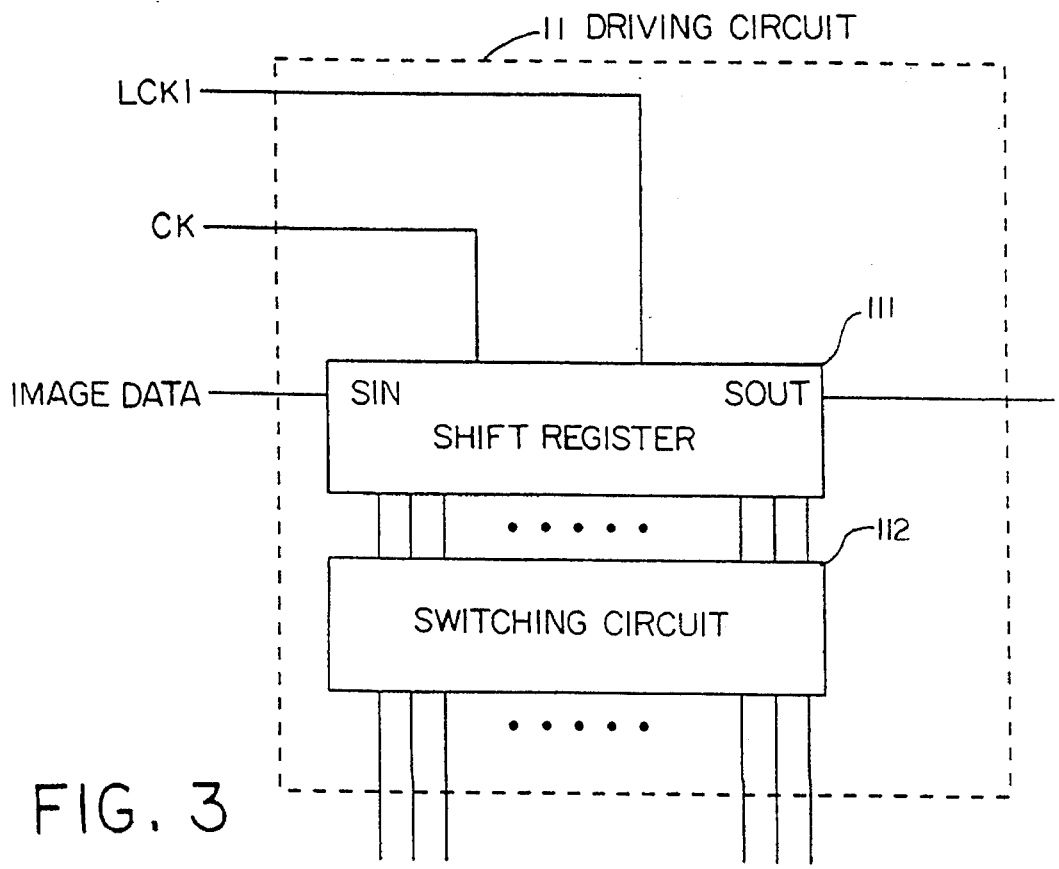
FIG. 3 is a block diagram showing a character printing head driving circuit included in a thermal head of a first example of the present invention.

FIG. 3 shows a configuration of the driving circuit 11 for driving the character printing head 12. As is shown in FIG. 3, the driving circuit 11 includes a shift register 111 for shifting input image data and a switching circuit 112 for driving each of the plurality of heat emitting elements $12_{-1}$ to $12_{-n}$. The driving circuit 13 has the same structure as the driving circuit 11.

Figure 4A:
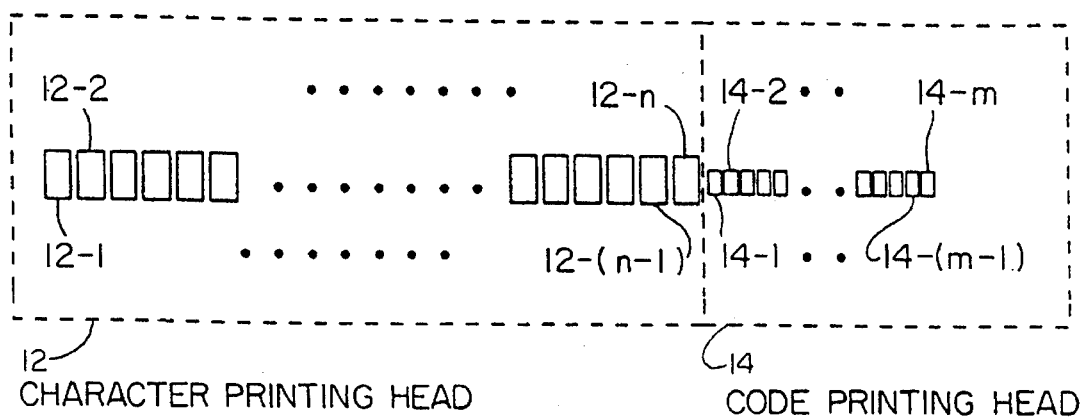
FIG. 4A is a view showing an arrangement pattern for heat emitting elements in a thermal head of a first example of the present invention.

FIG. 4A shows an arrangement pattern of the heat emitting elements of the thermal head 1. Each of the heat emitting elements forms a dot image on the paper sheet. The size of each of the heat emitting elements $12_{-1}$ to $12_{-n}$ in the character printing head 12 in the sub-scanning direction (i.e. in the first direction) is larger than a sub-scanning pitch. When a printing operation corresponding to one line is completed, the paper sheet 5 is conveyed in the first direction by the sub-scanning pitch. Accordingly, it is possible that printed dots on the paper sheet formed by the character printing head 12 corresponding to a line overlap those corresponding to the next line.

On the other hand, the size of each of the heat emitting elements $14_{-1}$ to $14_{-m}$ in the code printing head 14 in the sub-scanning direction is the same as or smaller than the sub-scanning pitch. Accordingly, printed dots on the paper sheet formed by the code printing head 14 corresponding to a line do not overlap those corresponding to any other lines.

Figure 4B:
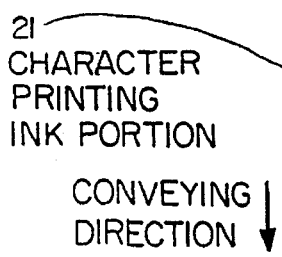
FIG. 4B is a view showing a configuration for a thermal-transferable ink sheet of a first example of the present invention.

FIG. 4B shows a configuration of the thermal-transferable ink sheet 2. More specifically, FIG. 4B shows one side of the thermal-transferable ink sheet 2 on which printing ink is applied. The paper sheet 5 is to be conveyed in the first direction. In FIG. 4B, the first direction is represented by an arrow and is referred to as the "conveying direction".

The thermal-transferable ink sheet 2 includes a character printing ink portion 21 and a code printing ink portion 22. The character printing ink portion 21 and the code printing ink portion 22 are separated from each other along the first direction. The character printing ink portion 21 includes a black material, while the code printing ink portion 22 includes a material which transmits a visible region of a light spectrum and absorbs an infrared region of the light spectrum. When the character printing ink portion 21 and the code printing ink portion 22 are heated by the character printing head 12 and the code printing head 14, respectively, the respective materials included in the thermal-transferable ink sheet 2 are transferred onto the paper sheet 5.

Hereinafter, an operation of the image printing apparatus having the above-mentioned configuration will be described.

The image data generating circuit 7 receives character data and generates character image data and code image data based on the input character data. The character image data and the code image data are supplied to the thermal head 1 as a serial signal corresponding to one line. The thermal head controlling circuit 8 supplies a clock signal CK and latch signals LCK1 and LCK2 to the thermal head 1.

The image data from the image data generating circuit 7 is input to the driving circuit 11 of the thermal head 1 sequentially. In the driving circuit 11, the image data are input to the shift register 111 at an $S_{in}$ terminal.

The shift register 111 shifts the input image data in accordance with the clock signal CK sequentially, and outputs the image data at an $S_{out}$ terminal to the driving circuit 13. The shift register 111 includes a plurality of registers each storing one dot information. It is assumed that the number of the registers is n in this example. In this case, when the shift register 111 receives image data of n dots corresponding to one line through the $s_{in}$ terminal, each register in the shift register 111 outputs each one bit of information to the switching circuit 112 in accordance with the latch signal LCK1. The switching circuit 112 determines the on/off-state of each of the heat emitting elements $12_{-1}$ to $12_{-n}$ in accordance with each one bit of information.

Figure 5:
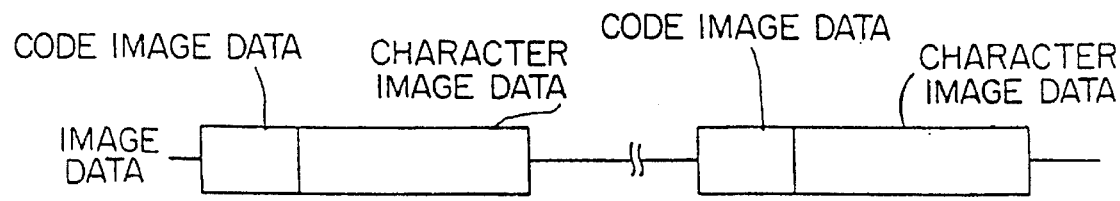
FIG. 5 is a diagram showing the timings of various signals for a thermal head of a first example of the present invention.
Figure 5:
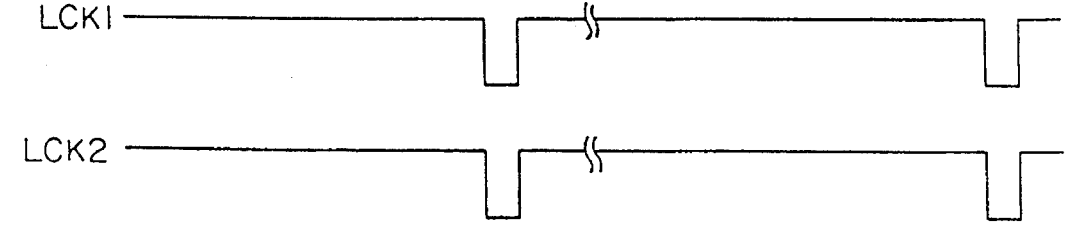

Similarly, in the driving circuit 13, the image data from the driving circuit 11 is input to a shift register (not shown). The shift register shifts the input image data in accordance with the clock signal CK sequentially. The shift register includes a plurality of registers each storing one dot information. It is assumed that the number of the registers is m in this example. In this case, when the shift register receives an image data of m dots corresponding to one line, each register in the shift register outputs each one bit of information to a switching circuit (not shown) in accordance with the latch signal LCK2. The switching circuit determines the on/off-state of each of the heat emitting elements $14_{-1}$ to $14_{-m}$ in accordance with each one bit of information. The timings of the clock signal CK, and latch signals LCK1 and LCK2 are shown in FIG. 5.

The on/off-state of each of the heat emitting elements $12_{-1}$ to $12_{-n}$ and $14_{-1}$ and $14_{-m}$ is controlled in the above-mentioned manner. As a result, the material included in the character printing ink portion 21 and/or the material included in the code printing portion 22 of the thermal-transferable ink sheet 2 is transferred onto the paper sheet 5.

The paper sheet 5 is conveyed by the platen roller 6 by the sub-scanning pitch in the first direction each time a printing operation corresponding to one line is completed. The thermal-transferable ink sheet 2 is wound from the sheet setting portion 3 to the sheet winding portion 4 by the same pitch as above.

By repeating the above-described operation, the codes are printed on the right end of the paper sheet 5 in a color obtained by transmitting a visible region in a light spectrum and absorbing an infrared region of the light spectrum, while the characters are printed in a black color. Further, the codes are printed at a density twice as high as that at which the characters are printed.

The printed codes in the color mentioned above are difficult to be seen by the human eyesight. However, such printed codes can easily be read by means of a reading apparatus which emits infrared rays and detects the intensity of reflected light.

The following conditions are assumed to clarify further advantages of the image printing apparatus according to the present invention over a conventional image printing apparatus:

(1) The character printing head has a printing density of 12 dots/mm, while the code printing head has a printing density of 24 dots/mm.

(2) The sub-scanning pitch is ½ mm.

(3) The sheet paper is in an A4-size.

(4) The characters are printed in a character region measuring 270 mm by 180 mm of the A4-size paper sheet.

(5) The codes are printed in a code region measuring 270 mm by 5 mm of the A4-size paper sheet.

Under the conditions mentioned above, according to the image printing apparatus of this example of the present invention, the number of the printed dots in the character region is 6,998,400, while the number of the printed dots in the code region is 388,800. Accordingly, when one bit of image data is assigned to one dot of a printed image, approximately 7.4M bits of image data are to be processed per A4-size paper sheet. In contrast, according to a conventional image printing apparatus, the number of the total printed dots is approximately 14,400,000, and approximately 13.7M bits of image data are to be processed per A4-size paper sheet under the same conditions except that both of the characters and the codes are printed at the same main-scanning printing density of 24 dots/mm.

According to the image printing apparatus of this example of the present invention, the total amount of image data to be processed decreases into about a half of that to be processed by a conventional image printing apparatus, since the codes are printed at twice as high a printing density as the characters are printed by the use of different types of printing heads. As a result, the amount of memory required for the processing of image data is decreased into about a half of that required for a conventional image printing apparatus. In addition, a high speed data processing and a high speed printing can be realized. Moreover, the number of elements for driving the thermal head can be reduced, because the number of the heat emitting elements required for the thermal head is decreased into about a half of that for the thermal head of a conventional image printing apparatus.

Further, the thermal-transferable ink sheet 2 includes a character printing ink portion 21 including an ordinary coloring material and a code printing ink portion 22 including a coloring material which transmits a visible region of a light spectrum and absorbs an infrared region of the light spectrum. The character printing ink portion 21 and the code printing ink portion 22 are separated from each other along the conveying direction of the paper sheet. The character printing head 12 is disposed so as to transfer a portion of the character printing ink portion 21 onto the paper sheet 5 and the code printing head 14 is disposed so as to transfer a portion of the code printing ink portion 22 onto the paper sheet 5. These features make it possible to simultaneously printing characters in an ordinary color and print codes in a color unidentifiable to human eye-sight.

Furthermore, the size of each heat emitting element of the character printing head 12 in the conveying direction is set so as to be larger than the sub-scanning pitch. Such a structure makes it possible to overlap a printed dot of a character corresponding to a line with a printed dot of a character corresponding to the next line. As a result, the printing quality in printing characters with no space between adjacent lines and/or in printing a thin line is kept high. In contrast, the size of each heat emitting element of the code printing head 14 in the conveying direction is set so as to be equal to or smaller than the sub-scanning pitch, and a printed dot by the code printing head 14 is made smaller in shape than that by the character printing head 12. Such a structure makes it possible to avoid the elimination of any space between printed dots by the code printing head 14.

In the example above, the characters and the codes are printed at the same printing density in the sub-scanning direction. This is because the character printing head 12 and the code printing head 14 are driven simultaneously every time character image data and code image data corresponding one line are transferred to the driving circuit 11 and the driving circuit 13.

Figure 6:
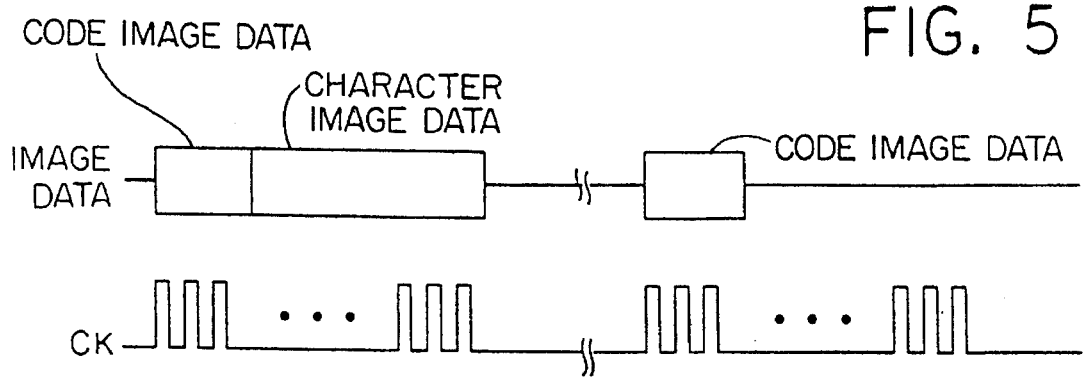
FIG. 6 is a diagram showing the timings of various signals for a thermal head of a modified version of a first example of the present invention.

However, it is also possible to increase the printing density for the codes in the sub-scanning direction to be twice as high as that for the characters by driving the character printing head 12 and the code printing head 14 in the following manner:

Referring to FIG. 6, character image data and code image data corresponding to one line are transferred to the character printing head 12 and the code printing head 14, respectively; then, the character printing head 12 and the code printing head 14 are driven to form character images and code images on the paper sheet 5, respectively; after that, the paper sheet 5 and the thermal-transferable ink sheet 2 are conveyed in the conveying direction by a half of the size of the heat emitting element of the character printing head 12 in the conveying direction; then, code image data corresponding to another adjacent line is transferred to the driving circuit 13, and only the code printing head 14 is driven to form code images on the paper sheet in accordance with the latch signal LCK2; after that, the paper sheet 5 and the ink sheet 2 are conveyed in the conveying direction by a half of the size of the heat emitting element of the character printing head 12 in the conveying direction.

EXAMPLE 2

The configuration of the image printing apparatus of the second example of the present invention is the same as that of the first example except for the arrangement pattern for the heat emitting element of the thermal head and the thermal-transferable ink sheet. In the second example, elements which have the same functions as those in the first example are indicated by like reference numerals. It is assumed that the paper sheet and the thermal-transferable ink sheet are conveyed in a first direction.

Figure 7:
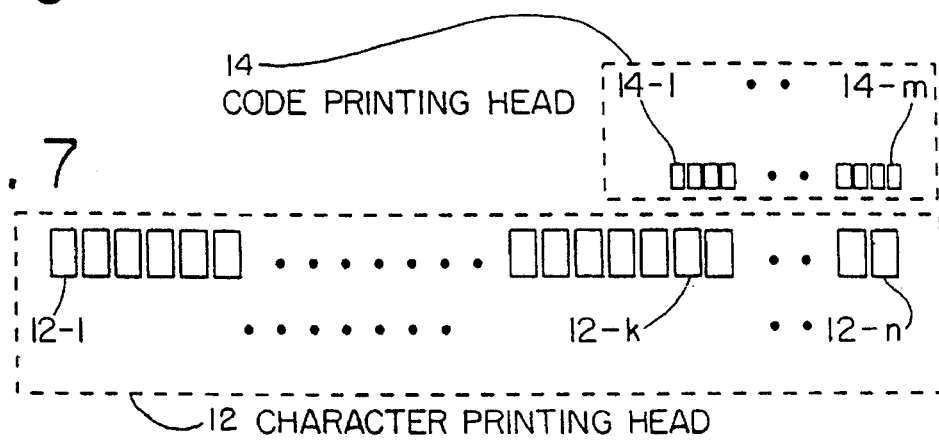
FIG. 7 is a view showing an arrangement pattern for heat emitting elements in a thermal head of a second example of the present invention.

FIG. 7 shows an arrangement pattern for heat emitting elements of the thermal head 1 of the second example. As is shown in FIG. 7, a character printing head 12 includes a plurality of heat emitting elements $12_{-1}$ to $12_{-n}$ which are arranged in a second direction which is substantially perpendicular to the first direction and a code printing head 14 includes a plurality of heat emitting elements $14_{-1}$ to $14_{-m}$ which are arranged in the second direction. The plurality of heat emitting elements $14_{-1}$ to $14_{-m}$ are arranged twice as densely as the heat emitting elements $12_{-1}$ to $12_{-n}$ are arranged. In addition, the plurality of heat emitting elements $12_{-1}$ to $12_{-n}$ are disposed on a straight line along the second direction, and the plurality of heat emitting elements $14_{-1}$ to $14_{-m}$ are disposed so as to be on another straight line along the second direction. The heat emitting elements $12_{-k}$ to $12_{-n}$ and the heat emitting elements $14_{-1}$ to $14_{-m}$ overlap each other in the first direction, where k is an integer satisfying the equation of $k=n-2m+1$.

As for the thermal-transferable ink sheet 2, a black coloring material is applied on the entire area of one face thereof.

The operation of the image printing apparatus including the thermal head 1 having a configuration mentioned above will be described with reference to FIGS. 1 and 2.

In printing character images along with code images, the image data generating circuit 7 generates such character image data that the heat emitting elements $12_{-k}$ to $12_{-n}$ of the character printing head 12 are in an off-state, and code image data. The character image data is input to the driving circuit 11. The driving circuit 11 drives the character printing head 12 in accordance with the input character image data so as to form character images on the paper sheet 5. The code image data are input to the driving circuit 13. The driving circuit 13 drives the code printing head 14 in accordance with the input code image data so as to form code images on the paper sheet 5.

In printing character images without code images, the image data generating circuit 7 generates such character image data and code image data that the heat emitting elements $14_{-1}$ to $14_{-m}$ of the code printing head 14 are in an off-state. As a result, by similar operations to those mentioned above, character images are formed on the paper sheet 5 over the entire length thereof in the second direction, whereas code images are not formed on the paper sheet 5.

As is described above, according to the image printing apparatus of the second example of the present invention, it is possible to form images on the paper sheet 5 over the entire length thereof in the second direction, as well as if an ordinary image printing apparatus was used, in the case where code images are not required to be formed on the paper sheet 5.

EXAMPLE 3

The configuration of the image printing apparatus of the third example of the present invention is the same as those of the previous examples except for the arrangement pattern for the heat emitting elements of the thermal head and the thermal-transferable ink sheet. In the third example, elements which have the same functions as those in the first example are indicated by like reference numerals. It is assumed that the paper sheet and the thermal-transferable ink sheet are conveyed in a first direction.

Figure 8:
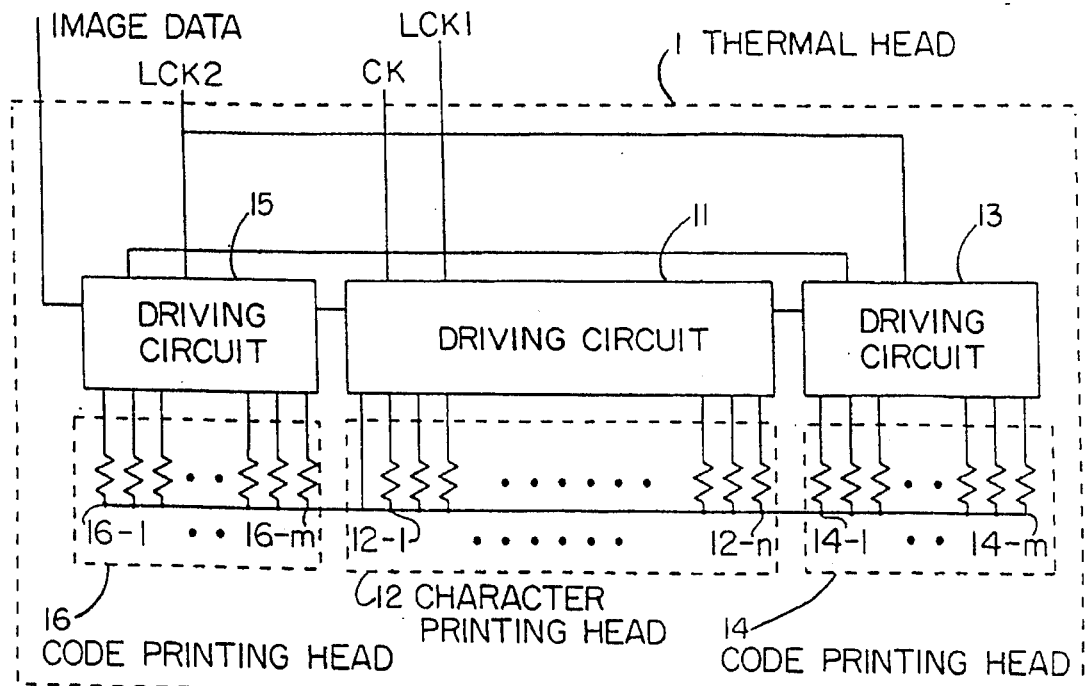
FIG. 8 is a block diagram showing a thermal head of a third example of the present invention.

FIG. 8 shows a configuration of the thermal head 1. As is shown in FIG. 8, the thermal head 1 includes a character printing head 12 including a plurality of heat emitting elements $12_{-1}$ to $12_{-n}$ which are arranged in a second direction which is substantially perpendicular to the first direction, a code printing head 14 including a plurality of heat emitting elements $14_{-1}$ to $14_{-m}$ which are arranged in the second direction, a code printing head 16 including a plurality of heat emitting elements $16_{-1}$ to $16_{-m}$ which are arranged in the second direction. The plurality of heat emitting elements $14_{-1}$ to $14_{-m}$ and the plurality of heat emitting elements $16_{-1}$ to $16_{-m}$ are arranged twice as densely as the heat emitting elements $12_{-1}$ to $12_{-n}$ are arranged. More specifically, the plurality of heat emitting elements $12_{-1}$ to $12_{-n}$ are spaced by a first pitch from one another in the second direction, while the plurality of heat emitting elements $14_{-1}$ to $14_{-m}$ and the plurality of heat emitting elements $16_{-1}$ to $16_{-m}$ are spaced by a second pitch from one another in the second direction, the first pitch being twice as large as the second pitch. In addition, the plurality of heat emitting elements $12_{-1}$ to $12_{-n}$, the plurality of heat emitting elements $14_{-1}$ to $14_{-m}$, and the plurality of heat emitting elements $16_{-1}$ to $16_{-m}$ are disposed substantially on a straight line along the second direction.

The thermal head 1 further includes a driving circuit 11 for driving the character printing head 12 and driving circuits 13 and 15 for driving the code printing heads 14 and 16, respectively.

These components 11 to 16 may be provided on a single substrate. It is preferable that the code printing head 14 is provided at one end of the thermal head 1, corresponding to the right end of the paper sheet 5, and that the code printing head 16 is provided at the other end of the thermal head 1, corresponding to the left end of the paper sheet 5. This is because there is usually a blank space on the right end of a document and/or on the left end of the document, where the codes are to be printed.

Figure 9A:
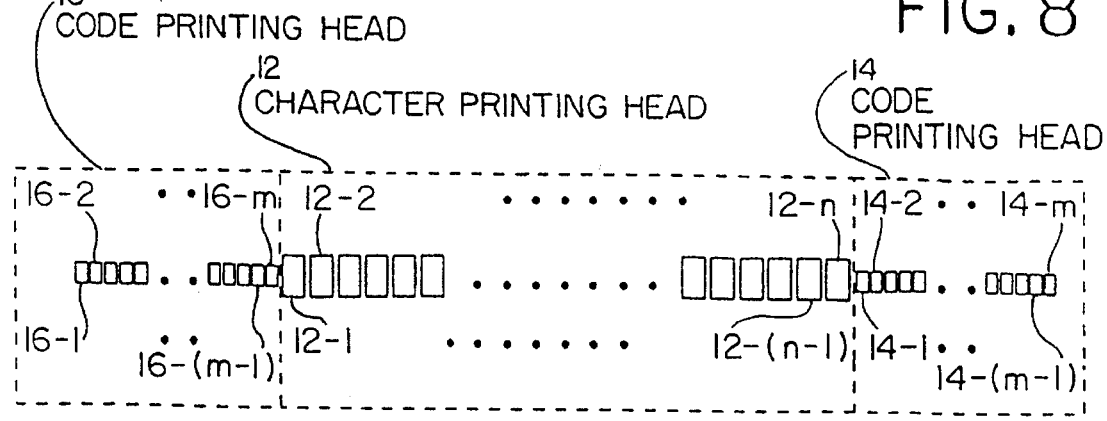
FIG. 9A is a view showing an arrangement pattern for heat emitting elements in a thermal head of a third example of the present invention.

FIG. 9A shows an arrangement pattern of the heat emitting elements of the thermal head 1. As is shown in FIG. 9A, the code printing heads 14 and 16 are provided at both ends of the thermal head 1.

Figure 9B:
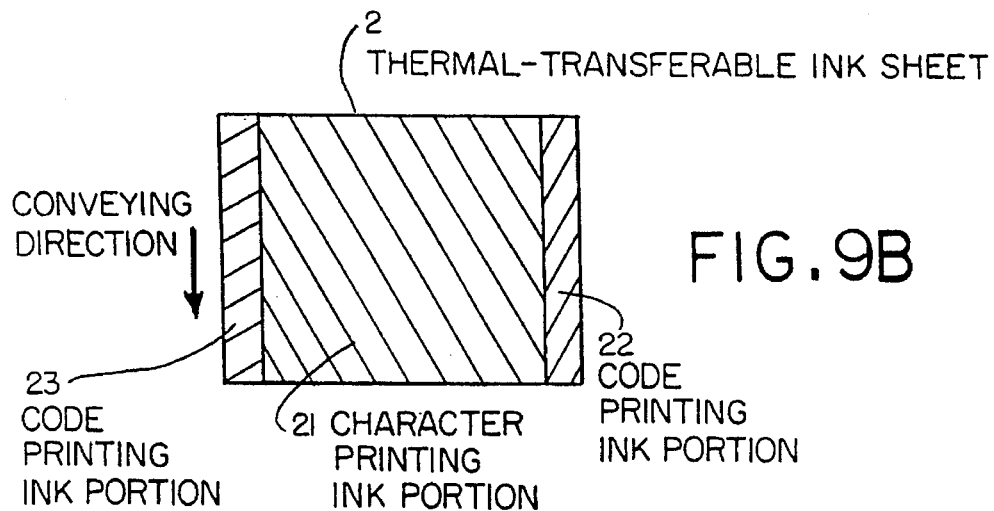
FIG. 9B is a view showing a configuration for a thermal-transferable ink sheet of a third example of the present invention.

FIG. 9B shows a configuration of the thermal-transferable ink sheet 2. More specifically, FIG. 9B shows one side of the thermal-transferable ink sheet 2 on which printing ink is applied. The paper sheet 5 is to be conveyed in the first direction. In FIG. 9B, the first direction is represented by an arrow and is referred to as the "conveying direction".

The thermal-transferable ink sheet 2 includes a character printing ink portion 21 and code printing ink portions 22 and 23. The character printing ink portion 21 and the code printing ink portions 22 and 23 are separated from one another along the first direction. The character printing ink portion 21 includes a black material, while each of the code printing ink portions 22 and 23 includes a material which transmits a visible region of a light spectrum and absorbs an infrared region of the light spectrum. When the character printing ink portion 21 and the code printing ink portions 22 and 23 are heated by the character printing head 12 and the code printing heads 14 and 16, respectively, the respective materials included in the thermal-transferable ink sheet 2 are transferred onto the paper sheet 5.

Hereinafter, an operation of the image printing apparatus having the above-mentioned configuration will be described, with reference to FIGS. 1 and 8.

In printing code images only on the right and of the paper sheet 5, the image data generating circuit 7 generates such code image data that the heat emitting elements $14_{-1}$ to $14_{-m}$ of the character printing head 14 are available, and that the heat emitting elements $16_{-1}$ to $16_{-m}$ of the code printing head 16 are in an off-state. The code image data are input to the driving circuits 13 and 15. The driving circuit 13 drives the code printing head 14 in accordance with the input code image data so as to form code images only on the right end of the paper sheet 5.

In printing code images only on the left end of the paper sheet 5, the image data generating circuit 7 generates such code image data that the heat emitting elements $14_{-1}$ to $14_{-m}$ of the code printing head 14 are in an off-state, and that the heat emitting elements $16_{-1}$ to $16_{-m}$ of the code printing head 16 are available. The code image data are input to the driving circuits 13 and 15. The driving circuit 15 drives the code printing head 16 in accordance with the input code image data so as to form code images on only the left end of the paper sheet 5.

In printing code images on both of the left end and the right end of the paper sheet 5, the image data generating circuit 7 generates such code image data that the heat emitting elements $14_{-1}$ to $14_{-m}$ of the code printing head 14 are available, and the heat emitting elements $16_{-1}$ to $16_{-m}$ of the code printing head 16 are available. The code image data are input to the driving circuits 13 and 15. The driving circuits 13 and 15 drive the code printing heads 14 and 16, respectively, in accordance with the input code image data so as to form code images on the left end and the right end portion of the paper sheet 5.

According to the image printing apparatus of the third example of the present invention, it is possible to switch to print code images only on the right end, or only on the left end, or on both ends of the paper sheet 5, depending on the needs of a user, by providing the code printing heads 14 and 16, respectively, on the right end and the left end of the thermal head 1 and providing the code printing ink portions 22 and 23, respectively, on the right end and the left end of the thermal-transferable ink sheet 2.

EXAMPLE 4

Figure 10:
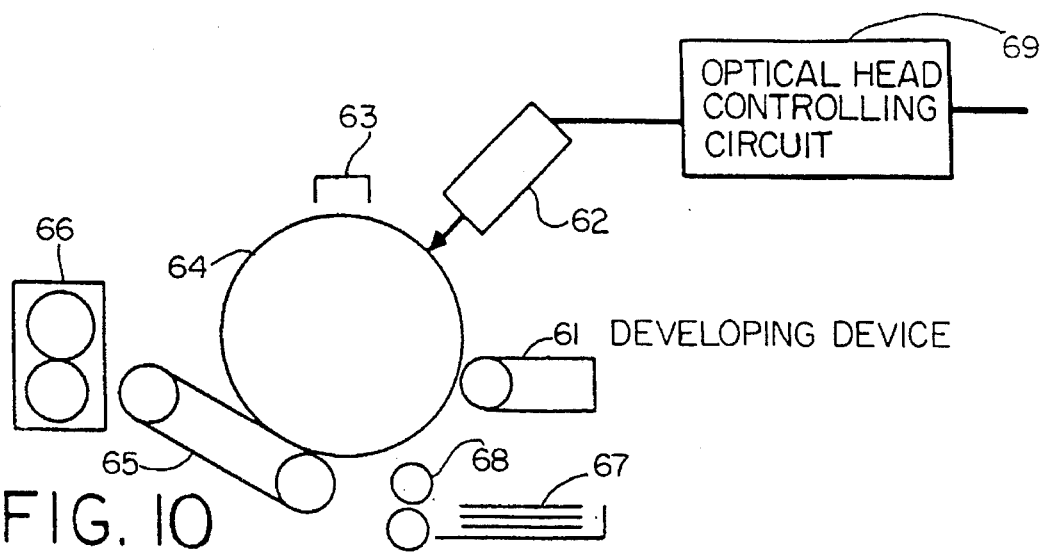
FIG. 10 is a view showing a configuration for an image printing apparatus according to a fourth example of the present invention, relating to an electronic photographic printer.

FIG. 10 shows a configuration of an image printing apparatus according to the fourth example of the present invention. The fourth example relates to an electronic photographic printer.

As is shown in FIG. 10, the image printing apparatus includes a developing device 61, an optical head 62, a charger 63, a photosensitive drum 64, a transferring belt 65, a fixing device 66, a paper sheet 67, a feed roller 68 for feeding paper, and an optical head controlling circuit 69.

Figure 11:
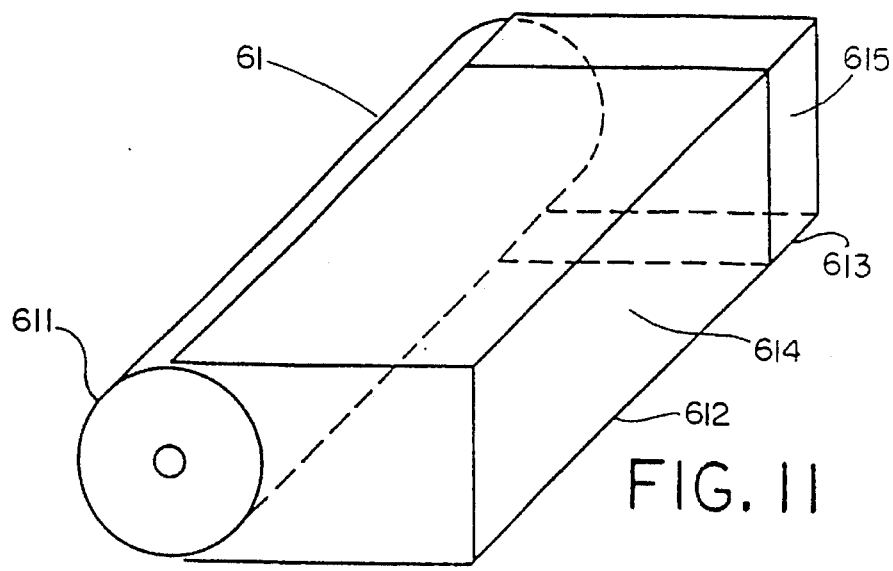
FIG. 11 is a view showing a configuration for a developing device of a fourth example of the present invention.

FIG. 11 shows a configuration of the developing device 61. As is shown in FIG. 11, the developing device 61 includes a sleeve 611, a character printing toner container 612, and a code printing toner container 613. The character printing toner container 612 and the code printing toner container 613 contain, respectively, character printing toner 614 including a black coloring material and code printing toner 615 including a coloring material which transmits a visible region in a light spectrum and absorbs an infrared region in the light spectrum.

Hereinafter, an operation of the image printing apparatus having the above-mentioned configuration will be described, with reference to FIGS. 10 and 11.

The surface of the photosensitive drum 64 is uniformly charged at a certain potential by the charger 63. The optical head controlling circuit 69 controls the optical head 62 based on character printing data, code printing data, and control signals, so as to form electrostatic latent images of characters and codes on a surface of the photosensitive drum 64. The electrostatic latent images of the codes are formed in an end portion of a region of the surface of the photosensitive drum 64 to which the toner from the code printing toner container 613 adheres.

In the developing device 61, the supplying of the character printing toner 614 from the character printing toner container 612 and the supplying of the code printing toner 615 from the code printing toner container 613 are conducted by rotation of the sleeve 611. Thus, the character printing toner 614 adheres to the electrostatic latent images of the characters formed on the surface of the photosensitive drum 64, while the code printing toner 615 adheres to the electrostatic latent images of the codes formed on the surface of the photosensitive drum 64. Thus, the electrostatic latent images are developed. The feed roller 65 feeds the paper sheet 67, onto which the toner adhering to the photosensitive drum 64 is transferred by means of the transferring belt 65. The transferred toner is melted onto the paper sheet 67 by means of the fixing device 66 so as to be fixed thereon.

Through the above-mentioned operation, the codes are printed on one end of the paper sheet 67. The printed codes are difficult to be seen by human eyesight. However, they can easily be read by means of a reading apparatus which emits infrared rays and detects the intensity of reflected light.

According to the present example, it is possible to simultaneously print characters in an ordinary color and to print codes in a color which is unidentifiable to human eyesight, using such a simple configuration as mentioned above. The reasons are: the developing device 61 has two toner containers, namely, the character printing toner container 612 and the code printing toner container 613, that are separated from each other along the direction of an axis of the photosensitive drum 64; the character printing toner container 612 supplies the character printing toner 614 including the black coloring material, which is used for developing the electrostatic latent images of the characters; and the code printing toner container 613 supplies the code printing toner 615 including the coloring material which transmits a visible region in a light spectrum but absorbs an infrared region of the light spectrum, which is used for developing the electrostatic latent images of the codes.

Instead of using the coloring material which transmits a visible region in a light spectrum but absorbs an infrared regions in the light spectrum, various other kinds of coloring materials can be used, as long as portions of the surface of the paper sheet to which the material is made to adhere have substantially the same luminous reflectance as the surface of the paper sheet. For example, toner including an ultraviolet-ray-absorbing material, a fluorescent material, or a yellow coloring material can be used.

EXAMPLE 5

Figure 12:
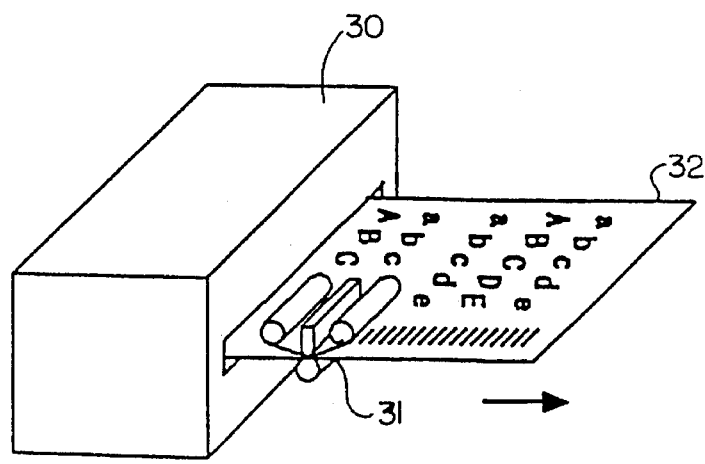
FIG. 12 is a block diagram showing an image printing apparatus according to a fifth example of the present invention.

FIG. 12 shows a configuration of an image printing apparatus according to the fifth example of the present invention. As is shown in FIG. 12, the image printing apparatus includes an electronic photographic printer section 30, a thermal-transfer printer section 31.

The electronic photographic printer section 30 prints characters on a paper sheet 32 using ordinary black toner. The thermal-transfer printer section 31 prints codes on the right end of the paper sheet 32 using ink including a coloring material which transmits a visible region in a light spectrum but absorbs an infrared region in the light spectrum.

In general, an electronic photographic printer has a problem that, in printing fine dots, a portion of toner scatters around each dot, thus blurring the printed dots. A line thermal-transfer printer, on the other hand, does not have such a problem, and produces sharply outlined dots. Therefore, a line thermal-transfer printer is advantageous in printing codes at a high density. Moreover, it is easy to form a line thermal-transfer printer in a small size, and therefore is advantageous in cases where codes are to be printed in only a small area, e.g. on one end portion of a paper sheet.

However, a line thermal-transfer printer is inferior to an electronic photographic printer in terms of running cost and printing speed.

According to the image printing apparatus of the fifth example of the present invention, it is possible to realize a code printing at high density, low running cost, and a high-speed image printing by printing characters and pictures by the use of the electronic photographic printer and by printing codes by the use of the line thermal-transfer printer.

In each of the examples described above, the code printing head is disposed so that code images are formed on at least one end portion of the paper sheet. However, it is easily understood that the code printing head can be disposed so that code images are formed in a central portion of the paper sheet.

Further, in each of the examples described above, a line thermal-transfer printer and an electronic photographic printer are described as an example of an image printing apparatus according to the present invention. The present invention is applicable to various other kinds of printers, as long as the printer has a section for conveying a printing medium in a first direction and a section for forming an image on the printing medium in a second direction which is substantially perpendicular to the first direction. For example, the present invention is applicable to an ink jet printer, a dot impact printer, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image printing apparatus comprising:

conveying means for conveying a printing medium including a first portion and a second portion in a first direction, the first portion and the second portion being separated from each other along the first direction;

first means for making a first printing material adhere to the first portion of the printing medium in a second direction which is substantially perpendicular to the first direction; and second means for making a second printing material adhere to the second portion of the printing material in the second direction, the first and second printing materials being different from each other, wherein a relative positional relationship between the first means, the second means and the printing medium is fixed with respect to the second direction.

2. An image printing apparatus according to claim 1, wherein the second printing material transmits light within a visible region of a light spectrum and absorbs at least a portion of light within a non-visible region of the light spectrum.

3. An image printing apparatus according to claim 1, wherein a surface of the second portion of the printing medium to which the second printing material is made to adhere has substantially a same luminous reflectance as a surface of the printing medium.

4. An image printing apparatus comprising:

conveying means for conveying a printing medium in a first direction;

means for conveying a material sheet including a first printing material and a second printing material in the first direction, the first and second printing materials being separated from each other along the first direction; and transferring means including a plurality of printing elements arranged in a second direction which is substantially perpendicular to the first direction, the plurality of printing elements transferring the first and second printing materials of the material sheet onto the printing medium.

5. An image printing apparatus according to claim 4, wherein the second printing material transmits light within a visible region of a light spectrum and absorbs at least a portion of light within a non-visible region of the light spectrum.

6. An image printing apparatus according to claim 4, wherein a surface of a portion of the printing medium onto which the second printing material is transferred has substantially a same luminous reflectance as a surface of the printing medium.

7. An image printing apparatus according to claim 4, wherein the material sheet is a thermal-transferable ink sheet, and the printing elements are heat emitting elements.

8. An image printing apparatus comprising:

conveying means for conveying a printing medium in a first direction;

printing means for printing an image including a plurality of dots on the printing medium, the printing means including a plurality of first printing elements and a plurality of second printing elements, each of the plurality of first printing elements printing one of the plurality of dots included in the image printed on the printing medium, each of the plurality of second printing elements printing one of the plurality of dots included in the image printed on the printing medium, wherein the plurality of first printing elements and the plurality of second printing elements print substantially simultaneously.

wherein the plurality of first printing elements are arranged in a second direction which is substantially perpendicular to the first direction, being spaced by a first pitch from one another, and the plurality of second printing elements are arranged in the second direction being spaced by a second pitch from one another, and wherein the first pitch and the second pitch are different from each other.

9. An image printing apparatus according to claim 8, wherein the plurality of second printing elements print an image on at least one of end portions of the printing medium.

10. An image printing apparatus according to claim 8, wherein the plurality of first printing elements and the plurality of second printing elements are disposed substantially on a single straight line.

11. An image printing apparatus according to claim 8, wherein a first region on the printing medium overlaps with a second region on the printing medium, where the first region is defined as a region printable by the plurality of first printing elements and the second region is defined as a region printable by the plurality of second printing elements.

12. An image printing apparatus according to claim 8, further comprising:

timing generating means for generating both a first pulse signal and a second pulse signal substantially simultaneously, the first pulse signal defining a timing of printing of the plurality of first printing elements, and the second pulse signal defining a timing of printing of the plurality of second printing elements.

wherein the plurality of first printing elements print in response to the first pulse signal, and the plurality of second printing elements print in response to the second pulse signal.

* * * * *